United States Patent [19]
Prasher

[11] 3,911,750
[45] Oct. 14, 1975

[54] APPARATUS FOR THE INTERNAL INSPECTION OF TUBULAR CONDUITS

[75] Inventor: Charles Lindsay Prasher, Croydon, England

[73] Assignee: The Babcock & Wilcox Company, New York, N.Y.

[22] Filed: Feb. 4, 1974

[21] Appl. No.: 439,183

[52] U.S. Cl............................................... 73/432 R
[51] Int. Cl.² ........................................ G01N 29/04
[58] Field of Search..... 73/40.5 R, 40.5 A, 71.5 US, 73/432 R; 324/37

[56] References Cited
UNITED STATES PATENTS

| | | | |
|---|---|---|---|
| 2,192,155 | 2/1940 | Schuldt............................ | 73/40.5 R |
| 2,470,338 | 5/1949 | Chilton ................................. | 324/37 |
| 2,940,302 | 6/1960 | Scherbatskoy..................... | 324/37 X |
| 3,117,453 | 1/1964 | Vernooy ........................... | 73/432 R |
| 3,409,897 | 11/1968 | Bosselaar et al................. | 73/40.5 A |
| 3,754,275 | 8/1973 | Carter et al...................... | 73/40.5 X |
| 3,786,684 | 1/1974 | Wiers et al........................ | 324/37 X |

*Primary Examiner*—Charles A. Ruehl
*Attorney, Agent, or Firm*—Joseph M. Maguire; Robert J. Edwards

[57] ABSTRACT

The invention comprises an apparatus for internally inspecting a tubular conduit such as the coil of a steam generator and includes a probe which is connected, through electrical leads, to a monitoring instrument. A plurality of spaced pistons are threaded onto the leads and are securely fixed relative thereto. The probe and pistons are sized to slidingly fit within the conduit. Pressurized fluid is provided to urge the probe and pistons along the conduit.

8 Claims, 6 Drawing Figures

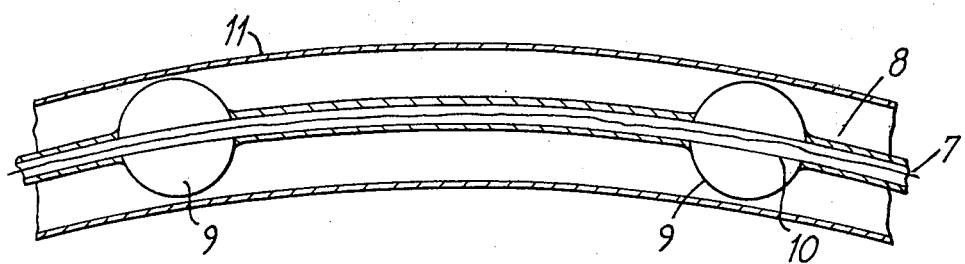
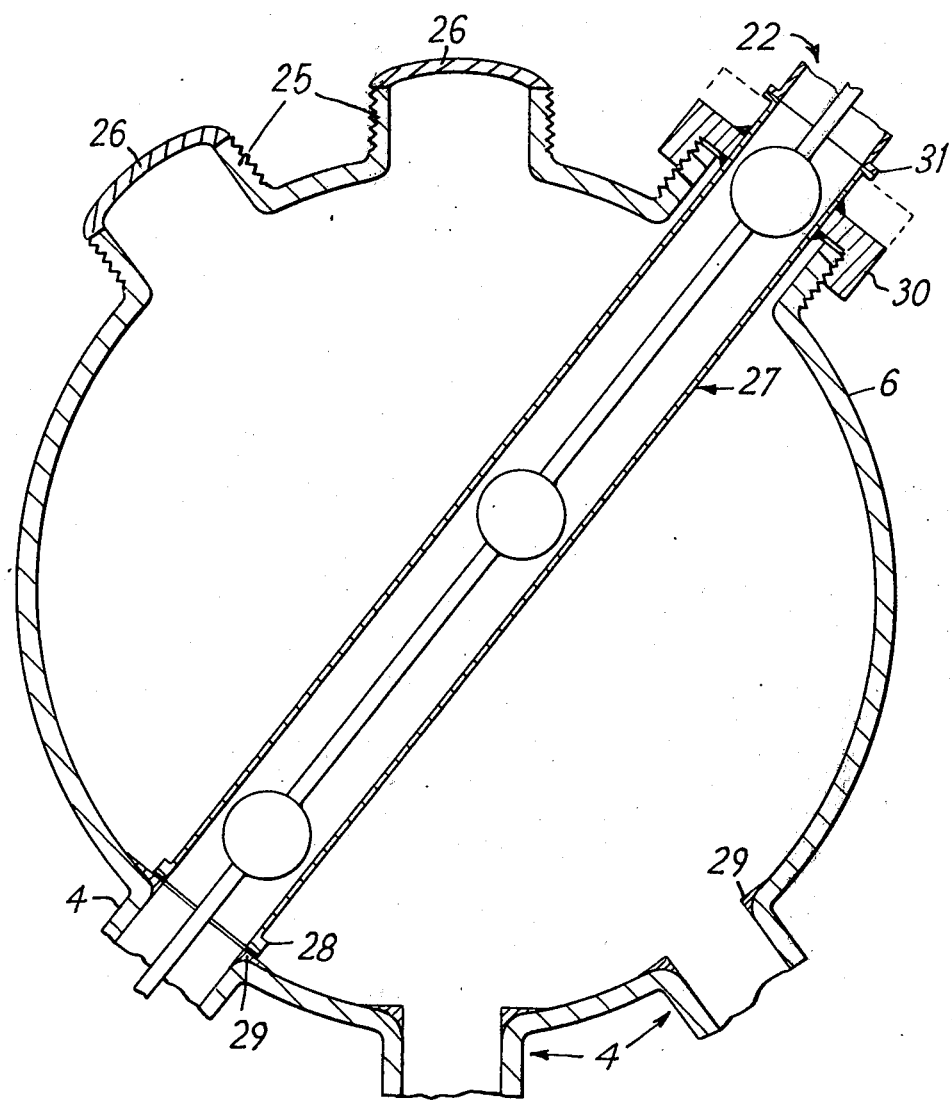

APPARATUS FOR THE INTERNAL INSPECTION OF TUBULAR CONDUITS

BACKGROUND OF THE INVENTION

The present invention relates to the inspection of tubular conduits. It has special relevance to the internal inspection of such conduits in the form of coiled tubes, and particularly to heat exchangers and steam generator equipment.

A tube may be inspected for soundness by passing through it a probe, such as an eddy current or ultrasonic probe or a miniature television camera. To energize the probe and to receive back signals from it, it is necessary that electrical conductor leads extend back through the tube from the probe to a location outside the tube. If however, the tube is a coiled one, frictional resistance between the leads and the wall of the tube builds up as an exponential function of the number of turns of the coil over which the leads are trailing, so that it becomes progressively more difficult to move the probe.

By means of the present invention, the large frictional resistance forces may be avoided.

SUMMARY OF THE INVENTION

The invention provides apparatus for the internal inspection of tubular conduits including a probe of a size small enough to pass freely along the bore of the conduit, electrical leads arranged to connect the probe to a monitoring instrument, a plurality of pistons which are sized to slidingly fit in the conduit to be inspected, the pistons being securely fixed relative to the leads at intervals therealong with the leads passing through the pistons and a pressurized fluid supply means connectible to the end of said conduit to supply a stream of pressurized fluid to the conduit in order to urge the probe along the conduit.

In another aspect the invention provides a method of internally inspecting a tubular conduit whereby a probe freely slidable along the bore of the conduit and connected by electrical leads to a monitoring instrument is inserted into one end of the conduit, the leads at intervals along their length passing through and being secured to pistons freely slidable along the conduit, at least one piston being inserted into the conduit and supplying a stream of pressurized fluid to the end of the conduit to urge the piston and probe along the conduit.

Preferably the leads run along a semi-rigid non-kinking flexible supporter, and in an especially preferred embodiment, the supporter is in the form of a hollow protective sheathing around the leads.

BRIEF DESCRIPTION OF THE DRAWINGS

The invention will now be described by way of example with reference to the accompanying partly diagrammatic drawings in which:

FIG. 1 is a portion of a steam generator tube with part of the apparatus for internally inspecting it in situ.

FIG. 3 is an enlarged portion of 2 showing a sealing and connecting arrangement between the tube to be inspected and the source of pressurized fluid for the inspection.

DESCRIPTION OF THE PREFERRED EMBODIMENT

Figure 2:
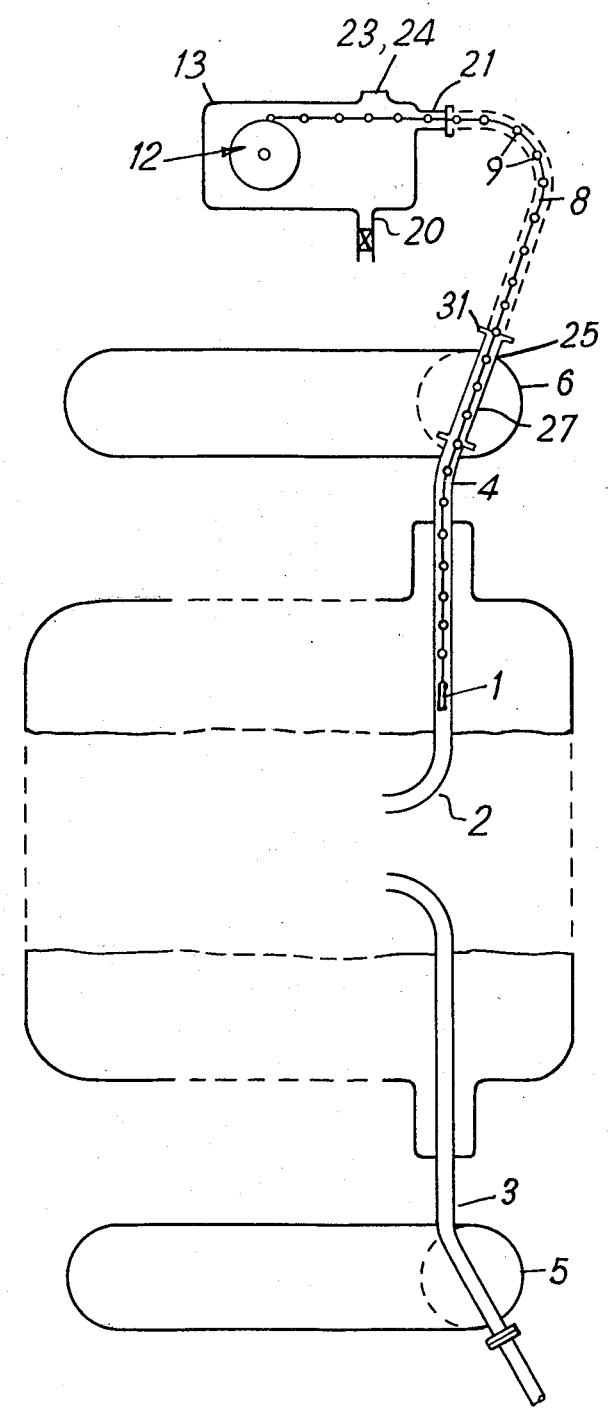
FIG. 2 is a complete system including a tube to be inspected with associated headers and sleeving and also the apparatus for internally inspecting the tube.

In the illustrated embodiment of the invention a conduit inspection apparatus includes an ultrasonic probe 1 which is used, according to procedure described below, to inspect for soundness helically coiled tubes 2 of a steam generator. FIG. 2 includes a diagrammatic representation of a steam generator. Each steam generator tube includes end portions, 3 and 4 one of which 3 extends downwardly for connection with a lower inlet header 5, and the other of which 4, extends upwardly for connection with an upper outlet header 6. Each header 5 and 6 is of toroidal form and circular cross-section.

Connected to the probe are electrical leads for energizing the probe and for the transmission back of signals from it to a receiving device. The leads 7 are protected by flexible metal sheathing 8, equal lengths of which extend between and are endwise secured to next adjacent spherical pistons 9. Each piston is of outside diameter somewhat less that the bore of the conduit 11, which forms part of the steam generator coil 2 and each piston includes an open-ended hole 10 which is aligned with the bore of the sheathing and through which the leads extend. The leads, sheathing and pistons are hereinafter collectively referred to as a probe line.

Figure 5:
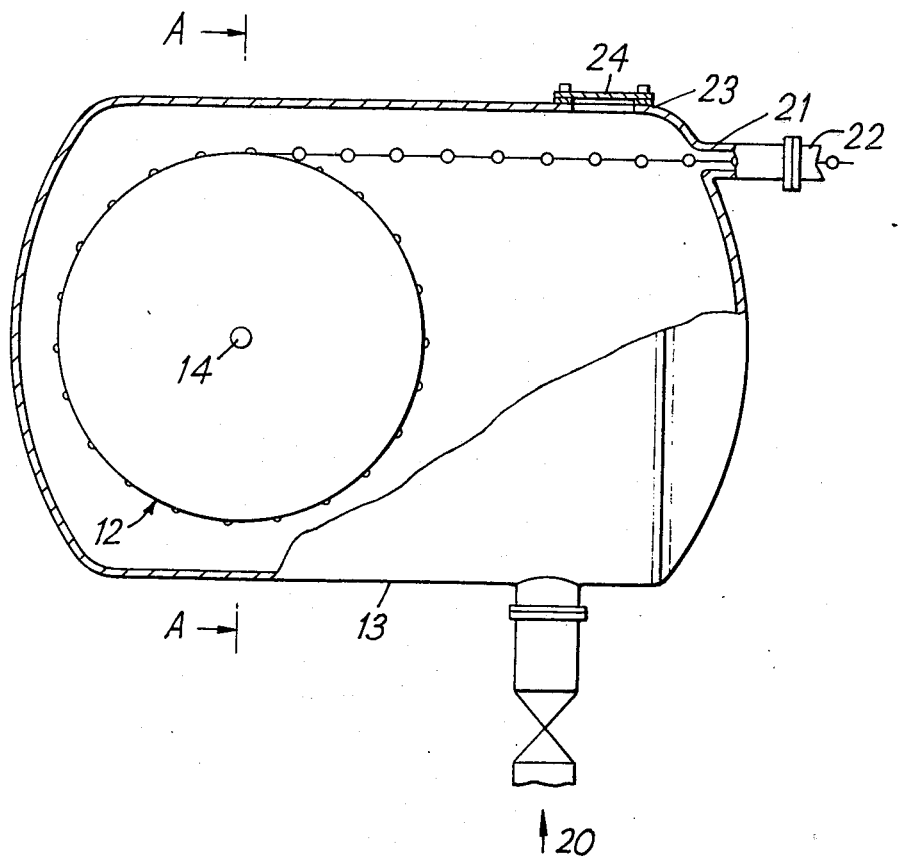
FIG. 5 is a pressure vessel containing a probe line (of probe, leads and pistons) wound onto a drum, the vessel having the necessary inlet for fluid and outlet for fluid and probe line.
Figure 6:
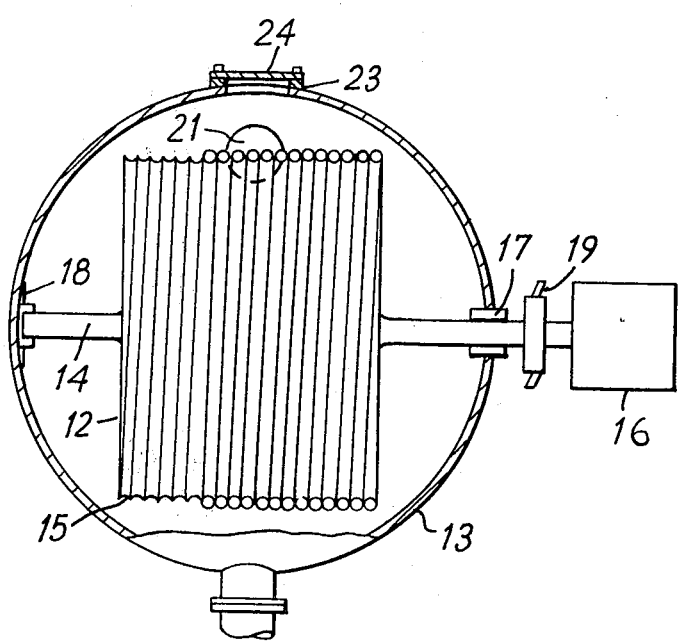
FIG. 6 is a cross section of FIG. 5 viewed in the direction of arrows A and shows the drum and means for mounting and driving it.

The conduit inspection apparatus also includes a winding drum 12 mounted on a horizontally extending hollow spindle 14 and disposed within a pressure vessel 13. An end of the probe line is anchored on the drum, the drum being provided, at the curved surface thereof, with a continuous helical groove 15 for locating the probe line when it is wound onto the drum as in FIGS. 5 and 6. The spindle projects at one end through the wall of the pressure vessel to an electric winding motor 16, the motor and spindle being drivably connected. Where it passes through the pressure vessel wall, the spindle is journalled in a fluid-tight seal bearing 17. The other end of the spindle is received in a fluid-tight seal bearing 18 secured at the inner side of the pressure vessel wall.

Mounted on the spindle 14 outside the pressure vessel is a commutator 19 which is electrically connected to the energizing and transmitting leads.

The pressure vessel includes an inlet 20 which is connectible to a source of water under pressure. The pressure vessel also includes an outlet 21 for the probe line. Connected to the outlet is a flexible armored connector tube 22 of internal diameter equal to that of the steam generator tubes to be inspected. Close to the outlet, the pressure vessel is fitted with an inspection port 23 and port cover 24, the purpose of which is described below.

Opposite to the end of each steam generator tube, where the tube joins the outlet header 6, this header is provided with an inspection port. Each such port comprises a tubular wall 25 which extends outwardly of the header and is of a diameter somewhat larger than that of the steam generator tubes.

Except when a tube is to be inspected, each port is closed by a weld attached cap 26 as in FIG. 3.

When a particular tube is to be inspected, the corresponding port is opened by removal of the cap. This allows a distance piece 27 to be inserted into the outlet header between the end of the steam generator tube to be inspected and the inspection port. The distance piece comprises a tubular member of equal internal diameter to the steam generator tube and having on the end which is inserted into the outlet header an outwardly projecting flange 28 which can mate with a seating surface 29 on the inside of the outlet header at the portion surrounding the steam generator tube orifice. The flange may be adapted to carry a gasket or sealing ring. The outer end portion of the tubular distance piece is provided with a cap fixedly secured to the distance piece and provided with an outer coaxial sleeve 30 spaced away from the distance piece and extending towards the inner end, the sleeve being internally threaded so as to be threadably engageable with the outer surface of the inspection port.

Thus the distance piece may be inserted into the outlet header and screwed home by the cap to urge the flange on the inner end of the distance piece tightly up against the seating surface on the header with a sealing ring or gasket compressed between the two mating surfaces to provide a fluid-tight seal. The cap is primarily a means for applying pressure to the seal at the other end of the distance piece but it may also incorporate a sealing ring within the cap to provide a fluid-tight seal between the cap and inspection port.

With the distance piece thus positioned and secured, the end of the connector tube 22 remote from the pressure vessel is connected to the distance piece by means of a flanged coupling 31.

The inspection procedure is then as follows. After the distance piece has been inserted into the header and the connector tube coupled up, the cover 24 of the inspection port of the pressure vessel is removed and the probe and a length of the probe line including a number of pistons are fed by hand through the outlet and into the connector tube, see FIGS. 2 and 5. The port cover 24 is then replaced, the probe energized, and the receiving device switched on. The pressure vessel is then connected to the source of water under pressure. The water stream thus caused to flow through the connector tube, distance piece and steam generator tube impinges on and flows past the pistons on the probe line within the tubing. The total force thereby provided is greater than the frictional resistance generated between these pistons and the enclosing walls, and the probe is thus moved forward, the probe line paying off the winding drum as it does so. The water stream also serves to provide a coupling medium for the ultrasonic probe by forming a film between the probe and the wall of the tube.

When it is required to withdraw the probe and probe line, the pressure vessel is disconnected from the source of pressurized water. A second distance piece, similar in construction to that above described, is then inserted into the inlet header 5 through an inspection port opposite to the steam generator tube concerned, and secured in position. The second distance piece is then connected to the source of pressurized water so as to provide a force on the pistons to move the probe line in a direction away from the inlet header and towards the outlet header and the pressure vessel (now not pressurized). At the same time, the electric winding motor 16 is run to wind the probe line back onto the winding drum. The stiffness of the flexible sheathing or supporter 8 of the probe line is such as to resist kinking during the withdrawal of the line.

Figure 4:
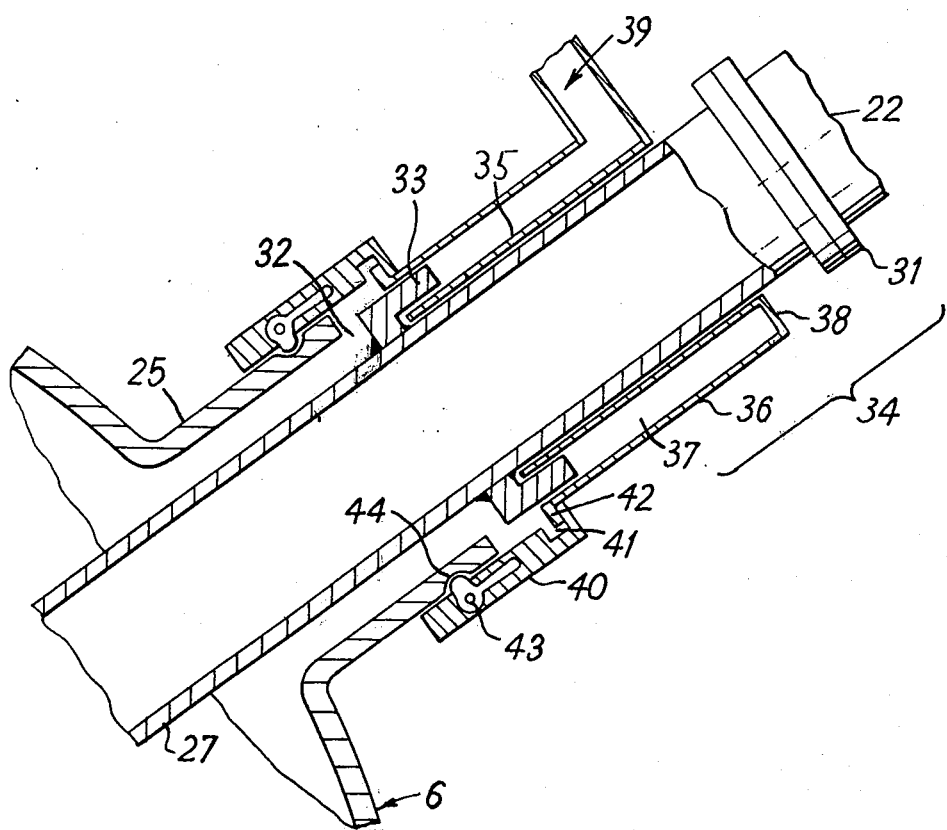
FIG. 4 is an alternative sealing arrangement to that shown in FIG. 3.

An alternative form of the distance piece shown in FIG. 4 comprises a tubular member of generally similar form to that of the above described distance piece. However, at the outer end, instead of there being a cap secured to the tubular member with its threaded coaxial sleeve projecting inwardly, there is secured thereto a flange 32 from the periphery of which there extends toward the outer end of the member a coaxial tubular portion 33. Surrounding the outer end of the distance piece is a hydraulic pressure applying unit 34. The unit comprises inner and outer coaxial sleeves 35 and 36, the space 37 between which is closed at one end by an annular plate 38. The space is closed at the other end by the coaxial tubular portion 33 which is a sliding fit between the sleeves. The pressure applying unit includes an inlet 39 which is connectible with the source of water under pressure. The unit is quickly connected to an inspection port of the outlet header by means of a snap-on connector 40 which comprises a split ring provided with an inner groove 41 which receives a flange 42 formed at the inner end of the outer sleeve of the pressure applying unit. The split ring is also provided with spring urged means 43 which cooperate with an annular groove 44 formed at the outer side of the tubular wall of the inspection port.

When it is desired to secure this type of distance piece relatively to the inspection port, the inlet 39 of the pressure applying unit is connected to the source of water under pressure. The required fluid-tight seal at the inner end of the distance piece is thus obtained, and is maintained until the pressure is released in the pressure applying unit.

The above described procedure of inserting the probe and probe line from one end of a tube, and withdrawing it from the same end, is especially advantagous if, for instance, a ferrule is secured within the tube at a location close to the other end of the tube. If, however, no obstructions are present, it may be preferred to arrange that the probe and probe line are withdrawn from the end of the tube opposite that of insertion.

Where it is convenient and safe to do so, the probe and the probe line may be withdrawn by connecting the source of pressurized water to the inlet header, the second distance piece being thus dispensed with. Alternatively the source of pressurized water may, instead of being connected directly to the inlet header, be connected to the outlet header, the water then flowing to the inlet header via the steam generator tubes other than the one which contains the probe line, extending between the headers in parallel and hence to the tube which is being inspected at the inlet header end.

It will be realized that fluids other than water may be used for forcing the probe along the tube. It will also be realized that the alternative form of distance piece above described may be pneumatically operated.

The need for such devices particularly arises in the case of relatively long coiled tubes of small diameter which have to be inspected in situ. With short tubes, for example those less than about sixteen feet (5 meters) long, other means such as the use of optical fibers are possible and in any case the frictional forces in feeding probes through short tubes do not usually present insuperable problems. However, in certain heat exchangers and steam generator tubes, for example in power stations, coils with axial lengths of the order of 300 feet (100 meters) and more are encountered and sometimes these are in closely arranged banks so that they cannot easily be inspected externally, and yet previously known internal inspection techniques are inadequate. Typically such tubes may have an internal diameter of about 1 inch (2.5 centimeters) and the header an internal diameter of about 9 inches (25 centimeters. It is to the inspection of these types of tubes that this invention is particularly directed.

In this case the winding drum for the probe line would have a diameter of about 4 feed (1¼ meters) and the pressure vessel be of a correspondingly large size to accommodate it.

However, the invention is not limited to use with such tubes. Shorter tubes may be inspected by this technique where it is more convenient than other techniques. As for the diameter of the tubes which can be inspected, probes are now available as small as 9 mm. and so tubes of diameters just larger than that could be inspected by the technique and as probes get smaller so does the utility of the invention increase. Larger tubes can similarly be accommodated up to limits where alternative techniques can take over. It is of course necessary to appreciate that a probe must be controllably mounted to ride along the conduit. If the probe is of a size roughly equivalent to that of the pistons, it will tend to act as a piston itself and ride smoothly along the center of the bore. If, however, the active part of the probe is of a much smaller size, it may need to be mounted inside guiding vanes or fins, or within or closely adjacent to a piston to avoid it moving about at random across the bore. The term probe, therefore is to be interpreted as including a casing which controls the position of the active part in relation to the axis of the conduit.

The next point to consider is the degree of curvature or tortuousness of the tubes for which the invention can be used, and this will clearly be related to the internal bore diameter of the tubes. Straight tubes present no problems at all. However, severe kinks and bends in tubes can prevent the efficient functioning of the device and/or the sheathing between the pistons might start to scrape the sides of the tube at the bend. It is envisaged that coils of tubes of internal diameter 1 inch (2.5 cm) would not normally have radius of curvature less than 12 inches (30 cm) and the device should easily accommodate such curvature.

It is also necessary that the tubes to be inspected are of roughly constant internal diameter. Manufacturers' tolerances giving rise to small variations can be ignored as can thermal variations. However, where tubes are joined the welds should not severely obturate the tube at that point. Furthermore, before passing the probe down a tube any scale deposits should be cleaned out, not only because scale build-up reduces the effective diameter of the tube (not necessarily uniformly) but also because it will interfere with the inspection.

These are practical limitations which should be apparent to a potential user.

Desirably the pistons are formed spherically or near spherically and may be closely abutting if desired rather than being spaced along the cable of the probe.

As for the material of the pistons, this should preferably be chosen so that it will not readily scrape off and leave traces in the tube to be inspected, but preferably it is not so hard that it might damage the conduits. Suitable plastic materials can be chosen for the pistons or ball bearings may be provided around the periphery of pistons 9 to facilitate their passage through the tubes. Suitable lubrication would prevent the bearings from being clogged by internal tube deposits, or the pistons may be formed with radial jets centering the pistons within the tube so that the pistons will "float" within the tube, upon the supply of fluid under pressure to the pistons.

The semi-rigid non-kinking flexible sheathing when used should be such that it will allow the probe-line (probe, leads, sheathing and pistons) to easily pass around the curves of the coil being inspected but not kink when it is compressed. In use, when such a sheathing is present, each piston will tend to push on the next adjacent part of the sheathing downstream and pull on the next adjacent part upstream and this will assist the primary thrust on the pistons caused by the fluid. Flexible "gas pipe" type of protection is suitable for this, for example the armored type having a helix of metal ribbon whose edges mate and interlock to give a flexible tubular structure, and which may be assisted by auxiliary padding, or by being wound around or embedded in a rubber or plastics material. Alternatively it may comprise a relatively thick walled rubber or plastics material tube of the type referred to as pressure tubing and which may have built in reinforcement such as webbing. For a 1 inch (2.5 cm) internal diameter conduit the sheathing could suitably be ¼ inch (65 mm) outside diameter.

Further, the pistons 9 may be dispensed with and a long flexible perforated tube used instead for inserting a probe head into a boiler tube. Pressurized fluid applied to the long flexible tube would then exit at the perforations to center and "float" the probe tube within the tube being inspected, thus reducing friction between them.

Preferably, the pistons are equi-spaced along the sheathing, the spacing being selected in the case of a conduit which includes curves or is coiled so that the sheathing will not contact the walls of the conduit. For example with a conduit of one inch (2.5 cm) inside diameter and curves of 12 inches (30 cm) radius, and a sheathing of ¼ inch (65 mm) outside diameter, spherical pistons might suitably be spaced every 6 inches (15 cm) from the center of one piston to the center of the next piston.

The sheathing for the leads may be continuous, extending between pistons and through them, or it may be in sections covering the portions of the leads between pistons but not through them.

Certain advantages arise from the latter technique in that one can assemble probe lines by "threading" units of sheathing and pistons onto the leads in the order sheath, piston, sheath, etc. with means for locking the units together. Units may also be produced having a piston and sheath already joined together. If pistons are placed at frequent intervals with short sections of sheathing between them, the sheathing may be of low flexibility provided that some means for relative angular movement between the pistons and sheathing is built in, such as simple ball and socket type of joint. In one arrangement, the leads may be built into the pistons for example in the form of a metallic strip or rod through them with terminals at the end to which flexible leads may be attached. In this case the term "leads"

from the probe will include the terminals and portions through the pistons as well as the portions between the pistons.

The fluid used to drive the pistons will normally be water but in certain circumstances for example with liquid sodium heat exchangers, an inert gas such as argon may be preferred. Alternatively, a chain of pistons may be provided, with the pistons equipped with radial expanders and operating in pairs. When the radial expanders of one piston of a pair are actuated to engage the tube wall the other piston of the pair is actuated to move forward. At the forward limit of drive, the radial expanders of the front piston are actuated to engage the tube wall, the expanders of the rear piston are retracted, and the rear piston moved up to the front piston. This alternating procedure is repeated for advancing the probe into the tube to be inspected.

It is envisaged that in practice a conduit may be "fingerprinted" by passing the probe down it when it is relatively new or known to be in good working order and keeping a permanent record of this. Then at a later date the same probe may be re-passed down the conduit and any changes in reading compared with the original traces so that changes may be more closely examined to see whether they represent faults.

It will be possible to do continuous traces while moving the probe into the tube or while withdrawing it, or it will be possible to introduce the probe to a given point and then take a static reading of the condition, followed by moving the probe further into, or out of the conduit and taking further readings.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

I claim:

1. Apparatus for the internal inspection of a tubular conduit comprising a source of pressurized fluid, and including a probe, electrical leads connecting the probe with a monitoring instrument, a plurality of spaced pistons threaded onto said leads and securely fixed relative thereto, the probe and pistons being sized to slide freely within said conduit, means for inserting the probe and at least one piston into one end of said conduit and for admitting pressurized fluid to said end to urge the probe and piston along said conduit.

2. Apparatus according to claim 1 wherein the leads run along a semi-rigid non-kinking supporter.

3. Apparatus according to claim 2 wherein the supporter is in the form of a protective sheathing.

4. Apparatus according to claim 3 wherein the sheathing includes a helix of metallic ribbon whose edges mate and interlock to form a flexible tubular structure.

5. Apparatus according to claim 2 wherein the supporter is formed of sections extending between pistons.

6. Apparatus according to claim 1 wherein the pistons are spherical in shape.

7. Apparatus according to claim 1 wherein the pistons are uniformly spaced.

8. Apparatus according to claim 1 wherein the probe is an ultrasonic device.

* * * * *

UNITED STATES PATENT AND TRADEMARK OFFICE
CERTIFICATE OF CORRECTION

PATENT NO. : 3,911,750
DATED : October 14, 1975
INVENTOR(S) : Charles Lindsay Prasher It is certified that error appears in the above-identified patent and that said Letters Patent are hereby corrected as shown below:

For the Assignee, "The Babcock & Wilcox Company" should read -- Babcock & Wilcox, Limited --.

Signed and Sealed this

Twenty-sixth Day of October 1976

[SEAL]

Attest:

RUTH C. MASON
*Attesting Officer*

C. MARSHALL DANN
*Commissioner of Patents and Trademarks*